UNITED STATES PATENT OFFICE.

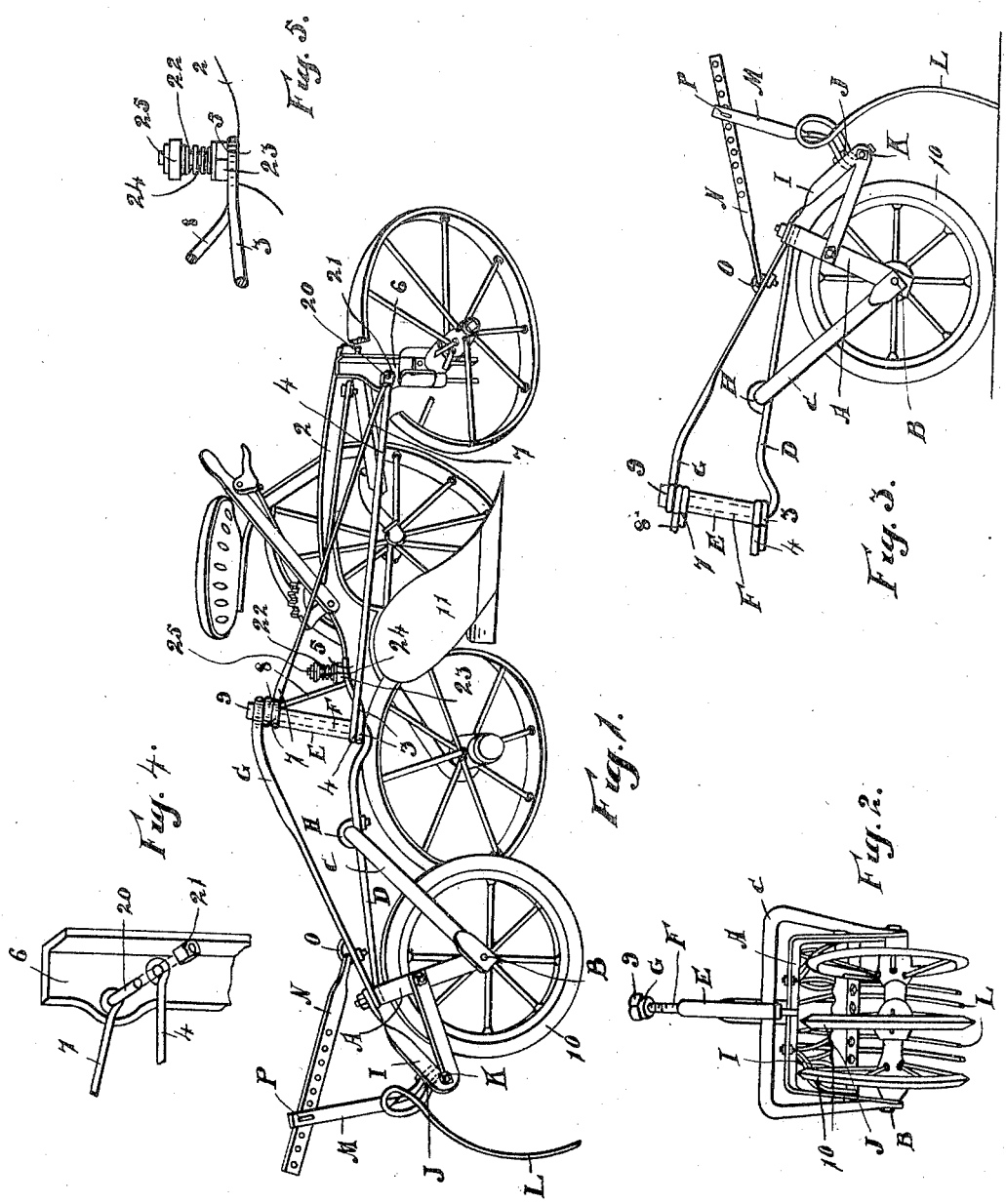

REUBEN REED MARKLE, OF GROS VENTRE, ALBERTA, CANADA.

COMBINED PACKER AND HARROW ATTACHMENT FOR SULKY-PLOWS.

950,699.      Specification of Letters Patent.      Patented Mar. 1, 1910.

Application filed July 27, 1909. Serial No. 509,950.

*To all whom it may concern:*

Be it known that I, REUBEN REED MARKLE, a subject of the King of Great Britain, residing at Gros Ventre, in the Province of Alberta, Canada, have invented certain new and useful Improvements in Combined Packers and Harrow Attachments for Sulky-Plows, of which the following is a specification.

My invention relates to improvements in combined packer and harrow attachments for sulky plows, and the principal object of my invention is to produce a simple, cheap, but effective implement which can be used in connection with sulky plows of any make, for the purpose of packing the sub-surface of the soil and covering it over immediately after the furrow is turned, in order to retain the moisture in the ground as long as possible.

Another object of my invention is to construct my implement so that it may be readily attached to, or detached from, any make of sulky plow, and the preferred construction of my invention will be hereinafter particularly explained, and the parts I claim as new will be set forth in the claims forming part of this specification.

Figure 1 is a side elevation of my implement showing the same attached to a sulky plow part of which is shown in perspective. Fig. 2 is a front perspective view of my implement, and Fig. 3 is a side elevation of the same, on an enlarged scale. Figs. 4 and 5 are enlarged details showing the construction used in attaching my implement to a sulky plow.

In the drawings, like characters of reference indicate corresponding parts in each figure.

In dry soils, particularly the soil in the North West Provinces, the sub-surface should be properly packed and the packed sub-surface lightly covered over as soon as possible after the furrow has been turned, so as to retain the moisture in the ground as long as possible. Now to perform this function of packing the sub-surface of the soil, and lightly cover the packed sub-surface, I have designed my implement, and my preferred construction thereof comprises a main frame A in the ends of which is mounted any suitable axle B. Also carried by the axle B is a yoke C which is suitably secured to the lower reach D, the front end F of which is bent so as to extend upward through the sleeve E.

G is an upper reach carried by the end F of the lower reach D, and it will be seen upon referring to Fig. 3 that the reaches D and G are carried by the main frame A after any suitable construction. Any suitable means may be employed for connecting the yoke C with the lower reach D, as for instance, the strap H.

I are end brackets carried by the main frame A, and mounted in the lower ends of the said brackets is the rock-bar J. Any suitable means may be used for mounting this rock-bar in place, as for instance, nuts and bolts K.

L are a plurality of spring-teeth carried by the rock-bar J, and in a staggered position, if desired. I do not claim any particular means for mounting the teeth L in the rock-bar J, as I may use any suitable construction for this purpose. It will of course be understood that the said teeth must be mounted in the said rock-bar so that a broken or damaged tooth may be readily removed and replaced. The teeth L are similar to those used on sulky-rakes.

M is a lever suitably secured to the rock-bar J.

N is a plate connected by any suitable coupling O to the upper reach G.

By means of the lever M, the teeth L can be raised or lowered, as will be understood, and by means of the bolt or pin P passing through the lever M and through one of the holes in the plate N, the lever M will be held in its adjusted position. Of course various means may be used for adjusting the position of the teeth L.

In Fig. 1 I show in perspective part of a sulky-plow 2. My attachment may be attached to any make of sulky-plow by any suitable means, but my preferred construction for that purpose consists of two lower reach rods 3 and 4 which are carried by the end F of the lower reach D. 20 is a bolt held in the member 6 of the frame of the sulky plow, and on this bolt is placed the eye-provided ends of the reaches 4 and 7 (see Fig. 4). 21 is a nut screwing on the bolt 20 to keep these ends of the said reaches in place. Through the outer eye-provided end of the reach-rod 3 passes a bolt 22 carried by the member 5 of the frame of the sulky plow. 23 is a nut on the bolt 22, and the same is held by the spring 24 upon the reach-rod 3. 25 is a nut on the bolt 22 holding the spring 24 under tension. I of course claim nothing new in these parts. 7 and 8 are upper reach rods which are carried by the end F of the lower reach D between the top of the sleeve E and the upper reach G. The reach rod 8 is preferably secured to the reach rod 3. 9 is a nut screwing on the top of the end F of the lower reach D and by means of which the various reaches are held in place. Mounted on the axle B are a plurality of packer wheels 10. As the sulky-plow is advanced the plowshare and mold-board 11 of course turn over the soil, and as the packer wheels 10 pass over the earth just turned up by the plowshare and mold-board, the sub-surface of the soil is packed and this packed sub-surface is covered over with a light covering of earth by means of the teeth L.

It will be noticed from the drawings, particularly Fig. 2, that the packer wheels 10 are provided with substantially V-shaped treads or peripheries. Now by means of this shape of the packer-wheels or the equivalent shape, the wheels pass through the top surface of the soil without packing it, and only pack the sub-surface.

Any make of packer wheels may be used, but I prefer to use the shape of wheels shown.

Although my attachment is primarily designed for use in connection with gang-ploys of any make, still it must be understood that I do not confine myself to using my attachment with this class of plow.

The end F of the lower reach D, and the sleeve E form what I term the head of the frame for my attachment.

While I have described what I consider to be the best embodiment of my invention, I desire it to be understood that the principles can be embodied in different forms, and I desire not to be limited beyond the requirements of the prior art, and the terms of my claims.

What I claim as my invention is:

1. The combination with an implement for plowing land, of an implement of the class described comprising a frame; an axle mounted in said frame; a plurality of packer-wheels mounted on said axle, and provided with peripheries substantially V-shaped; a plurality of teeth positioned behind said packer-wheels; means whereby said teeth are attached to said frame and adjusted, and means whereby said frame is attached to said plowing implement.

2. An implement of the class described comprising a main frame; an axle mounted in said frame; a plurality of packer-wheels mounted on said axle; a lower reach carried by said main frame, and having its front end bent upward; an upper reach carried by said main frame and having its free end carried by the turned end of said lower reach; a yoke mounted on said axle and secured to said lower reach; brackets carried by said frame; a rock-bar mounted in said brackets behind said packer-wheels; a plurality of teeth carried by said rock-bar, and means whereby said rock-bar is moved so as to adjust said teeth.

In testimony whereof I have affixed my signature in presence of two witnesses.

REUBEN REED MARKLE.

Witnesses:
D. G. WHITE,
H. O. KNOWLES.